United States Patent
Tsai et al.

(10) Patent No.: US 10,264,513 B2
(45) Date of Patent: Apr. 16, 2019

(54) METHOD OF DATA COMMUNICATION IN WIRELESS AD HOC NETWORK

(71) Applicant: MEDIATEK INC., Hsin-Chu (TW)

(72) Inventors: I-Cheng Tsai, Hsinchu County (TW); Chao-Chun Wang, Taipei (TW); Chih-Shi Yee, Hsinchu (TW); Yung-En Hsieh, Taipei (TW)

(73) Assignee: MEDIATEK INC., Hsin-Chu (TW)

( * ) Notice: Subject to any disclaimer, the term of this patent is extended or adjusted under 35 U.S.C. 154(b) by 0 days.

(21) Appl. No.: 15/647,283

(22) Filed: Jul. 12, 2017

(65) Prior Publication Data
US 2018/0041940 A1 Feb. 8, 2018

Related U.S. Application Data

(60) Provisional application No. 62/371,231, filed on Aug. 5, 2016.

(51) Int. Cl.
*H04W 40/32* (2009.01)
*H04W 52/28* (2009.01)
*H04W 72/12* (2009.01)
*H04L 29/08* (2006.01)
*H04W 4/08* (2009.01)
*H04W 84/18* (2009.01)

(52) U.S. Cl.
CPC ......... *H04W 40/32* (2013.01); *H04L 67/141* (2013.01); *H04L 67/325* (2013.01); *H04W 4/08* (2013.01); *H04W 52/283* (2013.01); *H04W 72/121* (2013.01); *H04W 84/18* (2013.01)

(58) Field of Classification Search
CPC ..................................................... H04L 12/50
USPC ....................................................... 370/400
See application file for complete search history.

(56) References Cited

U.S. PATENT DOCUMENTS

| | | | |
|---|---|---|---|
| 2010/0217615 A1 | 8/2010 | Brown | |
| 2015/0146620 A1 | 5/2015 | Phan | |
| 2015/0223047 A1 | 8/2015 | Abraham | |
| 2017/0302669 A1* | 10/2017 | Chen | H04W 4/70 |

* cited by examiner

*Primary Examiner* — Dang T Ton
(74) *Attorney, Agent, or Firm* — Winston Hsu

(57) ABSTRACT

A method of data communication for a communication device in a wireless ad hoc network is disclosed. The method comprises receiving a service publish message and a service subscribe message from a first communication device of a first service cluster and a second communication device of a second service cluster respectively, wherein the second communication device subscribes a service from the first communication device, and establishing a third service cluster including the first communication device and the second communication device, wherein a schedule of the third service cluster for the communication device, the first and second communication devices of the third service cluster to wake up for data transmission and reception is determined by the communication device or coordinated by the communication device, the first and the second communication devices.

12 Claims, 7 Drawing Sheets

METHOD OF DATA COMMUNICATION IN WIRELESS AD HOC NETWORK

CROSS REFERENCE TO RELATED APPLICATIONS

This application claims the benefit of U.S. Provisional Application No. 62/371,231, filed on Aug. 5, 2016 and entitled "Building a mesh network with neighborhood aware network protocol", the contents of which are incorporated herein in their entirety.

BACKGROUND

A wireless ad hoc network (WANET) is a decentralized type of wireless network. The network is ad hoc because it does not rely on a pre-existing infrastructure, such as routers in wired networks or access points in managed (infrastructure) wireless networks. Instead, each node participates in routing by forwarding data for other nodes, so the determination of which nodes forward data is made dynamically on the basis of network connectivity. In addition to the classic routing, ad hoc networks can use flooding for forwarding data.

Based on WANET concept, Wi-Fi Alliance introduces Wi-Fi Neighbor Awareness Networking (NAN) technology, which allows Wi-Fi devices to continuously discover other interesting services and devices. The Wi-Fi NAN is built upon the interaction of NAN devices grouped in clusters. Clusters are automatically created by nearby NAN devices that cooperate to synchronize to a common schedule. During that schedule, all NAN devices participating in the cluster are allowed to exchange service frames describing or requesting a service.

In addition, a NAN device could join more than one cluster, and each cluster has different schedule for negotiation. However, different clusters could not directly communicate with each other, and thus power consumption or service interruption may occur. For example, a service subscriber is looking for a service provided by a service provider. The service subscriber cannot receive the service from the service provider since the service provider and the service subscriber are too far apart. Reference is made to FIG. 1, which illustrates data transmission and reception in different data link clusters. In FIG. 1, there are two NAN clusters NDC_O and NDC_B, wherein the NAN cluster NDC_O includes the NAN devices NAN_1-NAN_3 and the NAN cluster NDC_B includes the NAN devices NAN_3-NAN_5. The NAN clusters NDC_O and NDC_B have their own schedule, and thus the NAN devices NAN_1-NAN_5 of the NAN clusters NDC_O and NDC_B wake up for data transmission and reception at different time slots. In FIG. 1, the NAN device NAN_2 of the NAN cluster NDC_O is played as the service provider SP, and the NAN device NAN_5 of the NAN cluster NDC_B is played as the service subscriber SS. In this case, the NAN_5 may not get the service from the NAN device NAN_2 since the NAN device NAN_2 is far from the NAN device NAN_5.

In another example, reference is made to FIG. 2. The NAN_3 of the NAN clusters NDC_O and NDC_B is played as the SP, the NAN_2 of the NAN cluster NDC_O and the NAN_5 of NAN cluster NDC_B are played as the SS. In this case, the NAN_3 has to transmit the service frame twice for the clusters NDC_O and NDC_B since the NAN_2 and NAN_5 are in different clusters with different schedules. In other words, the NAN_3 transmits the same data for each cluster due to the NAN devices NAN_2 and NAN_5 of the clusters NDC_O and NDC_B wake up at different time slots, which cause power consumption in the NAN device NAN_3.

SUMMARY

It is therefore an objective to provide a method of data communication in wireless ad hoc network in order to solve the abovementioned problems.

The present invention discloses a method of data communication for a communication device in a wireless ad hoc network. The method comprises receiving a service publish message and a service subscribe message from a first communication device of a first service cluster and a second communication device of a second service cluster respectively, wherein the second communication device subscribes a service from the first communication device, and establishing a third service cluster including the first communication device and the second communication device, wherein a schedule of the third service cluster for the communication device, the first and second communication devices of the third service cluster to wake up for data transmission and reception is determined by the communication device or coordinated by the communication device, the first and the second communication devices.

The present invention discloses a communication device of a wireless ad hoc network for data communication. The communication device comprises a storage unit for storing program code corresponding to a process, and a processing unit coupled to the storage unit, for processing the program code to execute the process, wherein the process comprises receiving a service publish message and a service subscribe message from a first communication device of a first service cluster and a second communication device of a second service cluster respectively, wherein the second communication device subscribes a service from the first communication device, and establishing a third service cluster including the first communication device and the second communication device, wherein a schedule of the third service cluster for the communication device, the first and second communication devices of the third service cluster to wake up for data transmission and reception is determined by the communication device or coordinated by the communication device, the first and the second communication devices.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
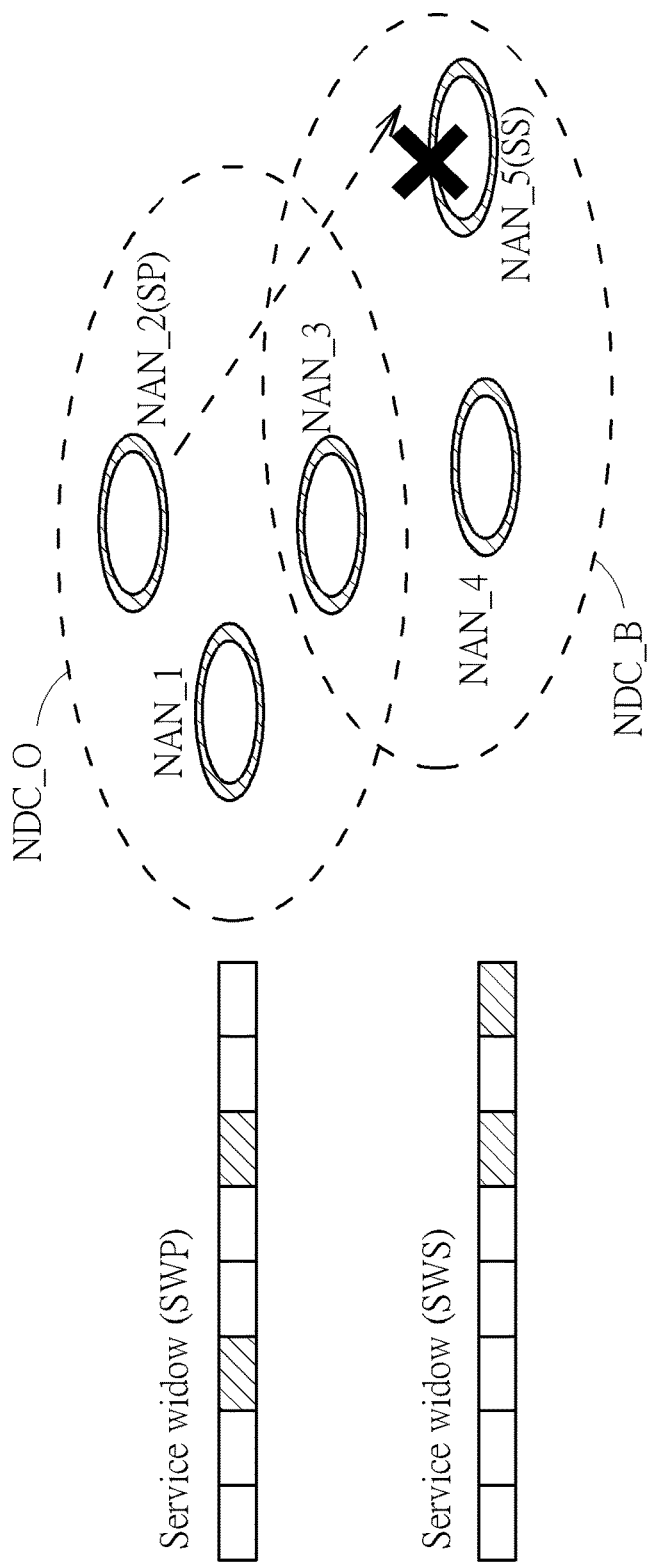
FIGS. 1-2 are schematic diagrams of data transmission and reception in different service clusters according to the prior art.
Figure 2:
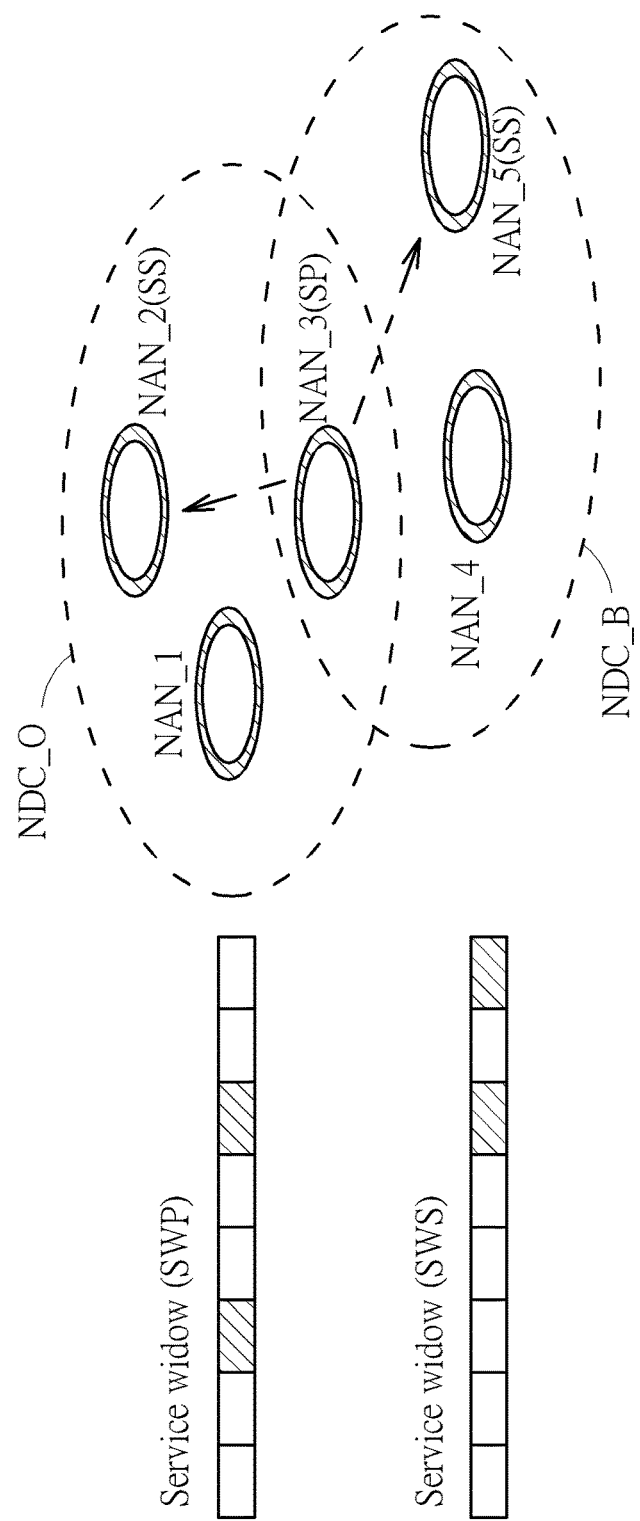
Figure 3:
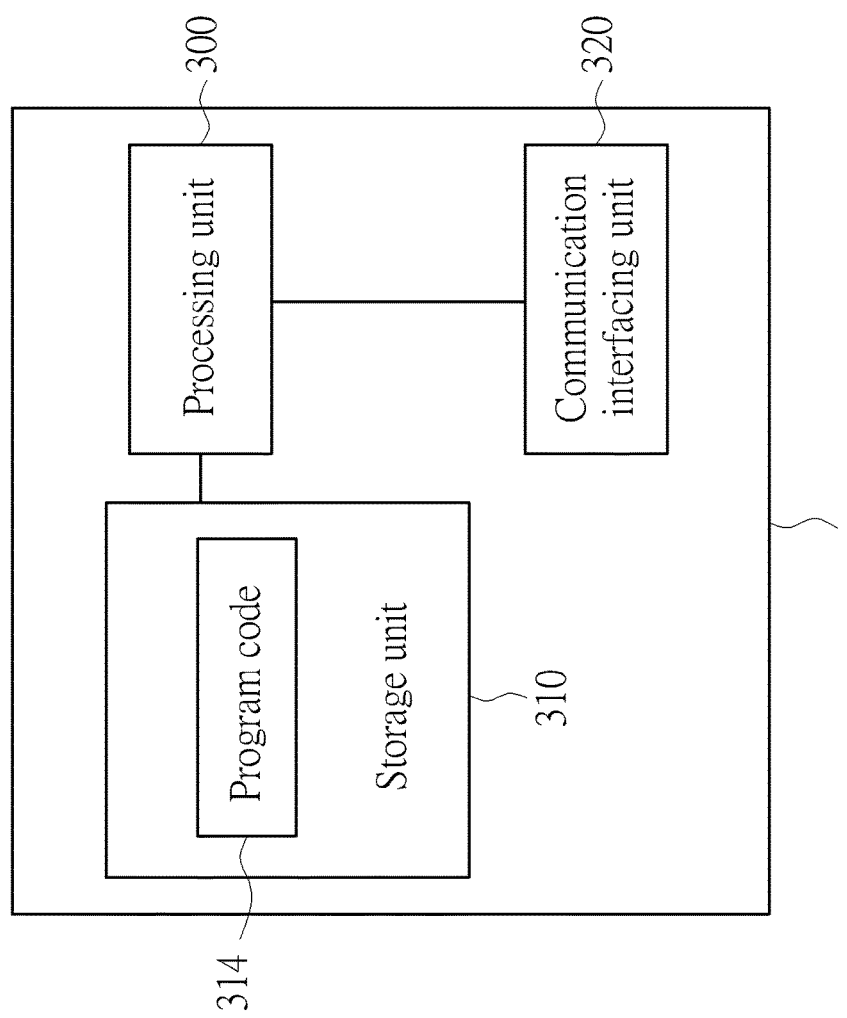
FIG. 3 is a schematic diagram of an exemplary communication device.

Wireless Ad Hoc Network consists of communication devices, which may be grouped in service clusters (i.e. NAN clusters of FIGS. 1 and 2) based on interesting services. FIG. 3 illustrates a schematic diagram of an exemplary communication device 30. The communication device 30 can be a Wi-Fi station, such as wearable devices, IoT devices, mobile phones, appliances, machine type devices, etc. compatible with wireless specification. The communication device 30 may include a processing unit 300 such as a processor, Application Specific Integrated Circuit (ASIC), etc., a storage unit 310 and a communication interfacing unit 320. The storage unit 310 may be any data storage device that can store program code 314 corresponding to a process, for access by the processing unit 300. The processing unit 300 may be coupled to the storage unit 310, for processing the program code 314 to execute the process. Examples of the storage unit 310 include but are not limited to a read-only memory (ROM), flash memory, random-access memory (RAM), CD-ROMs, magnetic tape, hard disk, and optical data storage device. The communication interfacing unit 320 may be a radio transceiver and can exchange wireless signals according to processing results of the processing unit 300.

Figure 4:
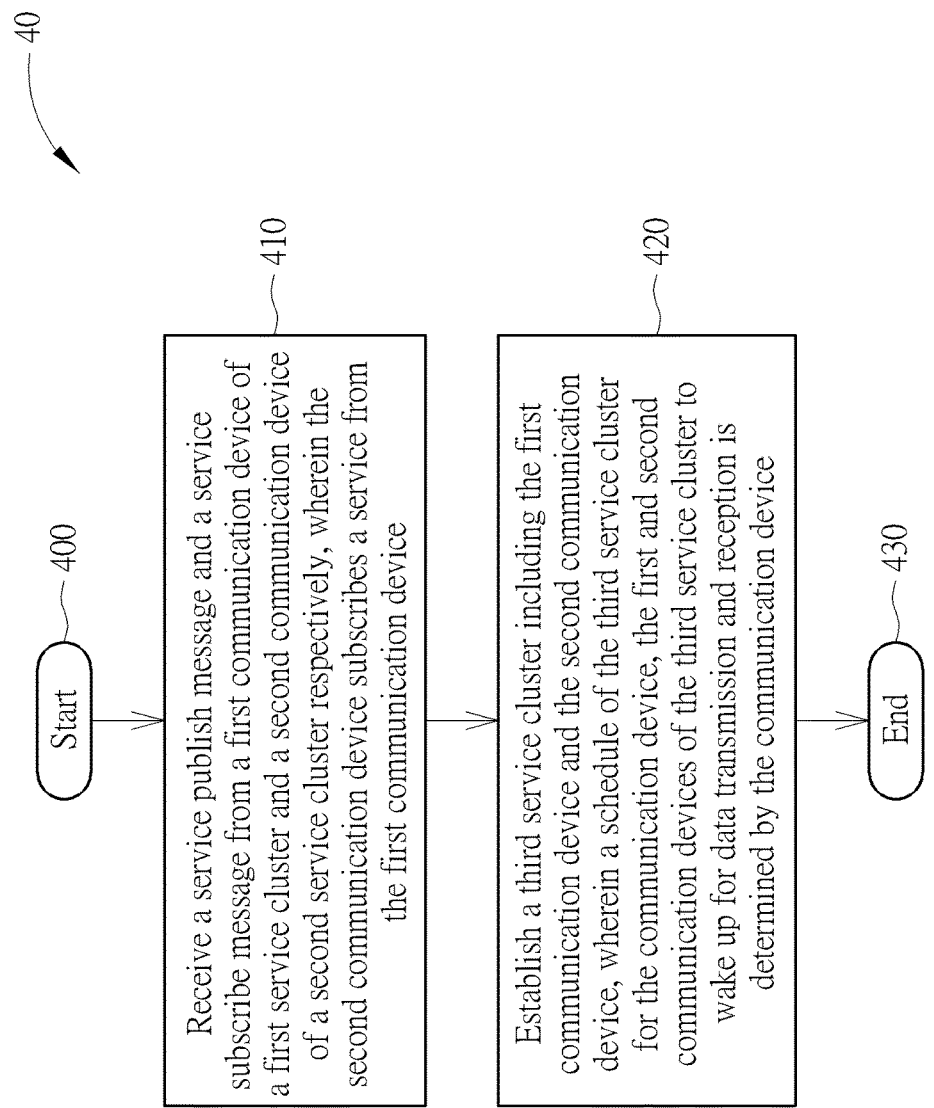
FIG. 4 is a flowchart of an exemplary process according to the present disclosure.

Please refer to FIG. 4, which is a flowchart of a process 40 according to an example of the present disclosure. The process 40 may be utilized in a communication device of FIG. 3 for data communication, which may comprise transmission, reception, or both. The process 40 may be compiled into the program code 314 to be stored in the storage unit 310 for being processed by the processing unit 300, and may include the following steps:

Step 400: Start.

Step 410: Receive a service publish message and a service subscribe message from a first communication device of a first service cluster and a second communication device of a second service cluster respectively, wherein the second communication device subscribes a service from the first communication device.

Step 420: Establish a third service cluster including the first communication device and the second communication device, wherein a schedule of the third service cluster for the communication device, the first and second communication devices of the third service cluster to wake up for data transmission and reception is determined by the communication device.

Step 430: End.

According to the process 40, service cluster establishment is triggered by a communication device, which is able to receive both of the service publish message and the service subscribe message from other communication devices belonged to at least two different service clusters. The newly established service cluster includes members from the at least two different service clusters, and thus members of the newly established service cluster wake up at a predetermined time.

In this article, a communication device receiving the service public message and the service subscribe message from two different service clusters and therefore establishing the service cluster is named as a proxy communication device. However, the proxy communication device may not be a member of these two original service clusters or join these two service clusters. In addition, a communication device transmits a service publish message is named as a service provider. A communication devices subscribes to the service provider and transmits a servicer subscribe message is named as a service subscriber.

Members of the newly established service cluster are all time alignment and wakes up at the same time slot. As a result, the proxy communication device can receive a service frame from the service provider and then forward to the service subscriber at the same time slot, so as to solve the problem of a service frame unable to arrive at the service subscriber far from the service provider.

In other words, the proxy communication device, the service provider and the service subscriber are grouped into one service cluster. This means that different service clusters including the service provider and the service subscriber are merged into one service cluster, and therefore the service provider and the service subscriber of two different service clusters can perform data transmission and reception with the same schedule.

In addition, with cluster mergence manner, the proxy communication device can transmit a notification to the service provider and the service subscriber for power increasing or position change. Thus, the service provider transmits the service frame to the service subscriber with larger power or proximity position, so as to realize the direct communication. Besides, when the proxy communication device becomes a service provider, the proxy communication device only transmits the service frame once, but the service frame can be arrived at multiple service subscribers at the same time slot, so as to reduce a number of times to transmit the same service frame for power saving.

Figure 5:
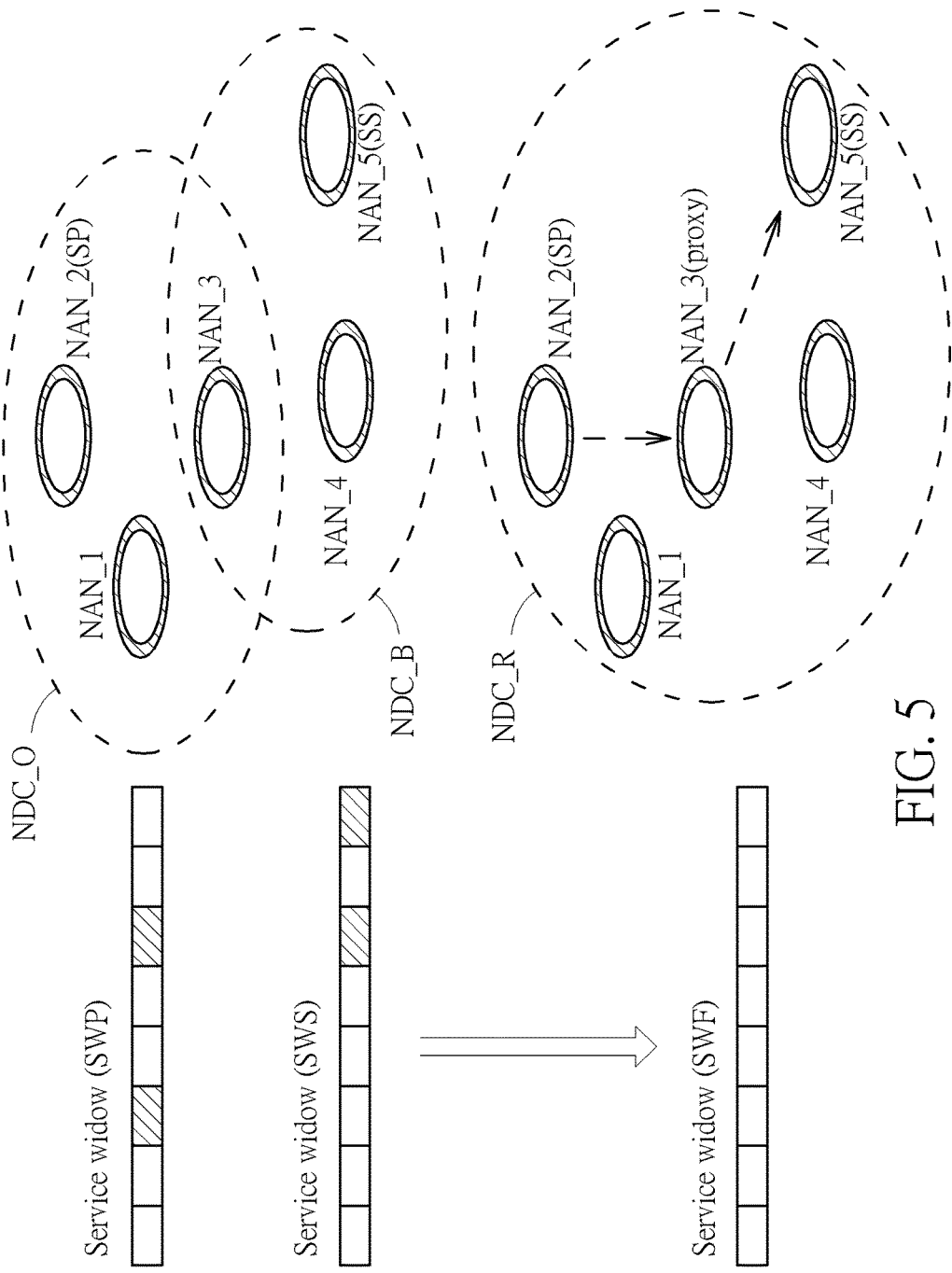
FIGS. 5-7 are schematic diagrams of data transmission and reception within a merged service cluster according to the present disclosure.

Please refer to FIG. 5, which illustrates an example of data forwarding in a Wi-Fi Neighbor Awareness Networking (NAN) structure. In this example, the NAN_2 of the NAN cluster NDC_0 is the service provider SP, the NAN device NAN_5 of the NAN cluster NDC_B is the service subscriber SS. The NAN device NAN_5 cannot receive the service frame from the NAN device NAN_2 since they are too far apart and they have different schedules for data transmission and reception. The NAN device NAN_3 is a proxy communication device, which receives the service publish message and the service subscribe message from the NAN devices NAN_2 and NAN_5 respectively. In addition, the NAN_3 establishes sessions with the NAN devices NAN_2 and NAN_5. With session establishment manner, the NAN device NAN_3 sets up a service window, SWS with the NAN device NAN_2 and a service window, SWP with the NAN device NAN_5. Note that, the service windows SWS and SWP set up by the NAN device NAN_3 have at least one shared time slot. Thus, the NAN devices NAN_2, NAN_3 and NAN_5 wake up for data transmission and reception at the same time slot. In other words, the NAN device NAN_3 determines a service window SWF including the at least one shared time slot for the NAN cluster NDC_R. Thus, members (e.g. NAN_2, NAN_3 and NAN_5) of the NAN cluster NDC_R complied with the service window SWF for data transmission and reception. As shown in FIG. 5, with the service window SWF determined based on the session establishments on the NAN clusters NDC_O and NDC_B, the NAN cluster NDC_R includes NAN clusters NDC_O and NDC_B is created thereof. Thus, the service provided by the NAN device NAN_2 is available at the at least one shard time slot and the NAN device NAN_5 is also available to receive the service at the at least one shared time slot. The NAN device NAN_3 bridges the traffic between the NAN devices NAN_2 an NAN_5 with the merged NAN cluster NDC_R complied with the service window SWF.

On the other hand, if the service windows SWS and SWP set up by the NAN device NAN_3 have no shared time slot, the NAN device NAN_3 and the NAN device NAN_2 and NAN_5 may negotiate to get a proper time for the service windows SWF of the NAN cluster NDC_R.

Besides, the service frame transmitted from the NAN device NAN_2 includes an address to the NAN device NAN_5. The service frame received by the NAN device NAN_3 and forwarding to the NAN device NAN_5 includes an address of the NAN_2 only. In other words, the NAN device NAN_3 may not modify the service frame with it's address.

With abovementioned schedule or service window determination for the service cluster mergence, the schedule of the original two NAN clusters NDC_O and NDC_B for data transmission and reception are not affected by the new schedule of the new created NAN cluster NDC_R. In other words, the merged cluster NDC_R is still belong to the original two NAN clusters NDC_O and NDC_B and therefore is complied with the original schedule of the NAN clusters NDC_O and NDC_B. This means the NAN devices wake up with the original schedules (i.e. service windows SWP and SWS) of the NAN clusters NDC_O and NDC_B and also wakes up with the new determined schedule (i.e. service window SWF) of the NAN cluster NDC_R.

Figure 6:
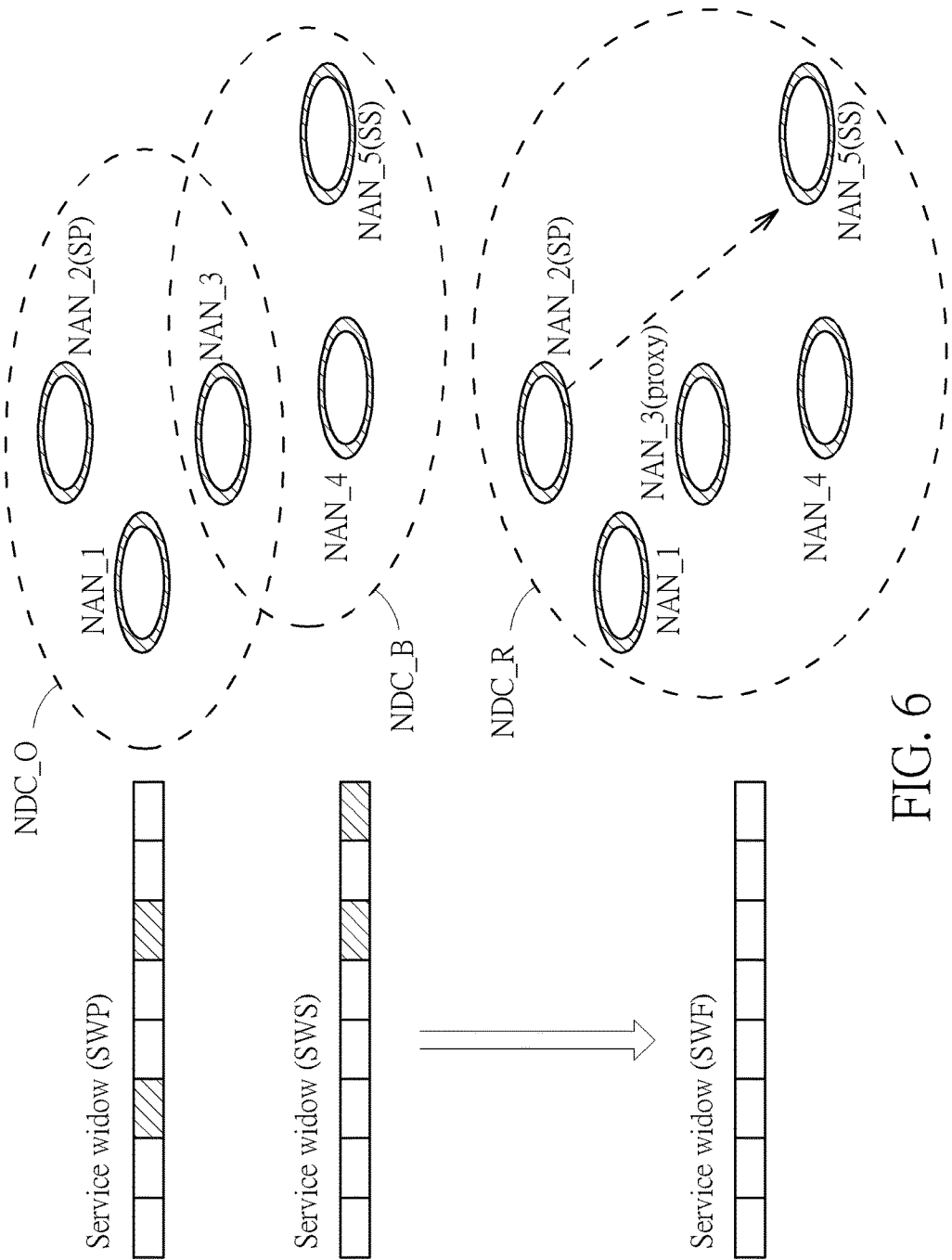

Please refer to FIG. 6, which illustrates an example of direct communication within the merged NAN cluster NDC_R. After establishing the NAN cluster NDC_R with the service window SWF, the NAN device NAN_3 sends a message to notify the NAN devices NAN_2 and NAN_5 of increasing power or changing the position. Thus, the NAN device NAN_2 and NAN_5 could increase the power or change the position for establishing connection directly. That is, the NAN device NAN_2 transmits the service frame to the NAN device NAN_5 directly at the shared time slot of the service window SWF without the NAN device NAN_3.

Figure 7:
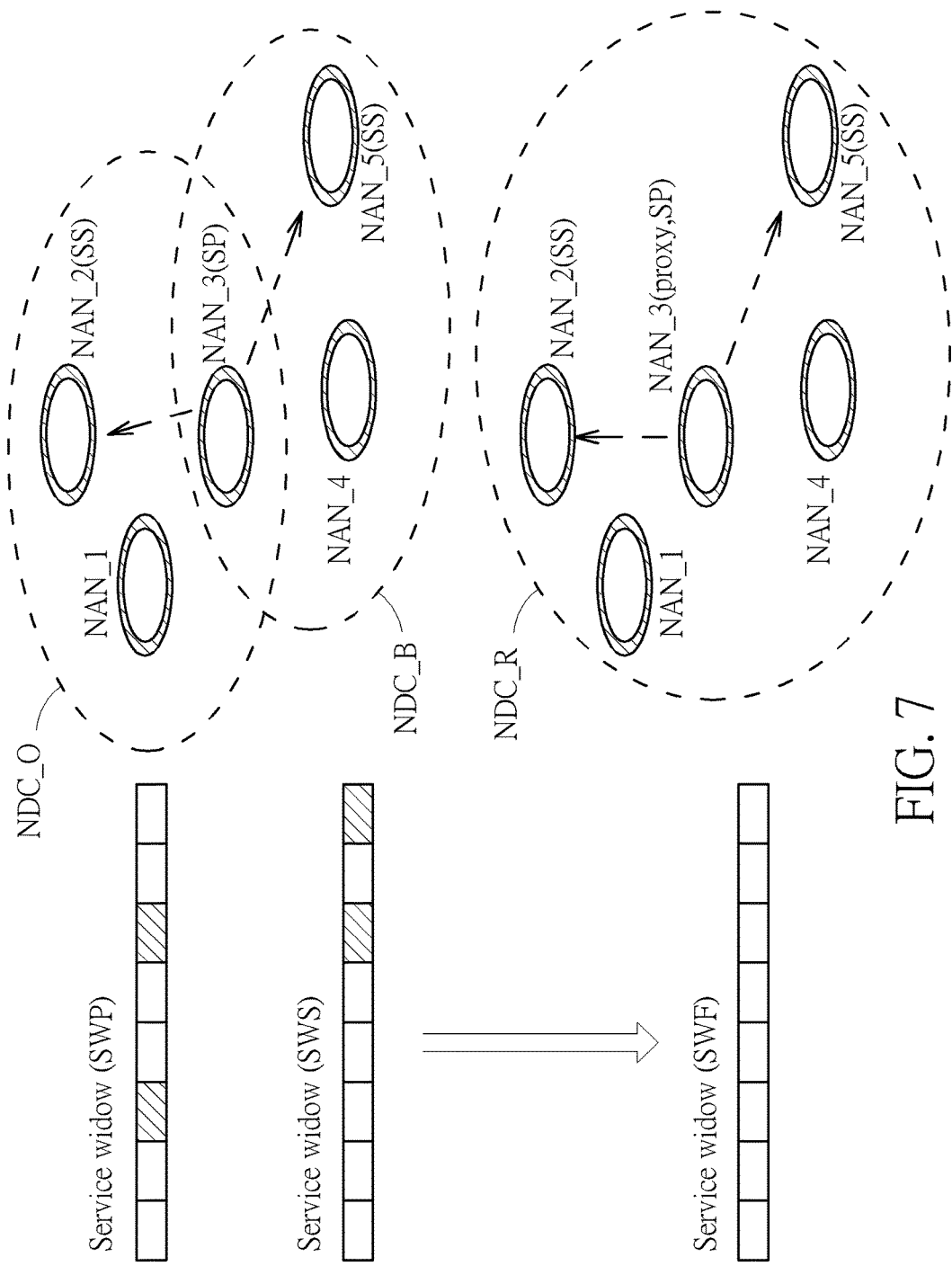

Please refer to FIG. 7, which illustrates an example of data transmission and reception within the merged NAN cluster NDC_R. In this case, the NAN devices NAN_2 and NAN_5 subscriber a service from the NAN device NAN_3. After establishing the NAN cluster NDC_R with the service window SWF, the NAN device NAN_3 transmits service frame once at the shared time slot of the service window SWF to both of NAN_2 and NAN_5 of the NAN clusters NDC_O and NDC_B. Thus, a number of times of data transmission are reduced to save power in the NAN device NAN_3.

The abovementioned steps of the processes/operations including suggested steps can be realized by means that could be a hardware, a software, or a firmware known as a combination of a hardware device and computer instructions and data that reside as read-only software on the hardware device or an electronic system. Examples of hardware can include analog, digital and mixed circuits known as microcircuit, microchip, or silicon chip. Examples of the electronic system can include a system on chip (SOC), system in package (SiP), a computer on module (COM) and the communication device 30.

In conclusion, the present invention provides a mechanism to merge different service clusters by establishing sessions with the service provider and service subscriber in different service clusters. In detail, the proxy communication device determines a new schedule for the merged service cluster based on the session establishment which coordinates a proper time for data transmission and reception between the proxy communication device, service provider and service subscriber, such that the devices of the different service clusters follow the new schedule of the merged service cluster and therefore wake up for data transmission and reception at the same time. Thus, data forwarding in the service cluster is realized to avoid service frame unable to arrive at other service clusters. Besides, the service frame can be transmitted to at least two different service clusters at one time, so as to save power.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of data communication for a communication device in a wireless ad hoc network, the method comprising:
   receiving a service publish message and a service subscribe message from a first communication device of a first service cluster and a second communication device of a second service cluster respectively, wherein the second communication device subscribes a service from the first communication device; and
   establishing a third service cluster including the first communication device and the second communication device, wherein a schedule of the third service cluster for the communication device, the first and second communication devices of the third service cluster to wake up for data transmission and reception is determined by the communication device or coordinated by the communication device, the first and the second communication devices.

2. The method of claim 1, wherein the schedule of the third service cluster is determined by:
   establishing a first session for the first communication device of the first service cluster, wherein the first communication device wakes up for data transmission and reception at a first schedule of the first session; and
   establishing a second session for the second communication device of the second service cluster, wherein the second communication device wakes up for data transmission and reception at a second schedule of the second session, wherein the first schedule and the second schedule include at least a shared time slot.

3. The method of claim 2, further comprising:
   receiving a service frame from the first communication device at the shared time slot; and
   forwarding the service frame to the second communication device at the shared time slot.

4. The method of claim 2, further comprising:
   receiving a service frame from the first communication device, wherein the frame is addressed to the second communication device; and
   forwarding the service frame to the second communication device, wherein the service frame includes an address of the first communication device.

5. The method of claim 2, further comprising:
   notifying the first and second communication devices for power increasing or changing a position, whereby the first communication device transmits a service frame directly to the second communication device with increased power or proximity position at the shared time slot.

6. The method of claim 2, further comprising:
   transmitting a service frame to both of the first and the second communication devices at the shared time slot when the first and second communication devices subscribe a service from the communication device.

7. A communication device of a wireless ad hoc network for data communication, comprising:
   a storage unit for storing program code corresponding to a process; and a processing unit coupled to the storage unit, for processing the program code to execute the process;
wherein the process comprises:
receiving a service publish message and a service subscribe message from a first communication device of a first service cluster and a second communication device of a second service cluster respectively, wherein the second communication device subscribes a service from the first communication device; and
establishing a third service cluster including the first communication device and the second communication device, wherein a schedule of the third service cluster for the communication device, the first and second communication devices of the third service cluster to wake up for data transmission and reception is determined by the communication device or coordinated by the communication device, the first and the second communication devices.

8. The communication device of claim 7, wherein the schedule of the third service cluster is determined by step of:
establishing a first session for the first communication device of the first service cluster, wherein the first communication device wakes up for data transmission and reception at a first schedule of the first session; and
establishing a second session for the second communication device of the second service cluster, wherein the second communication device wakes up for data transmission and reception at a second schedule of the second session, wherein the first schedule and the second schedule include at least a shared time slot.

9. The communication device of claim 8, wherein the process further comprises:
receiving a service frame from the first communication device at the shared time slot; and
forwarding the service frame to the second communication device at the shared time slot.

10. The communication device of claim 8, wherein the process further comprises:
receiving a service frame from the first communication device, wherein the frame is addressed to the second communication device; and
forwarding the service frame to the second communication device, wherein the service frame includes an address of the first communication device.

11. The communication device of claim 8, wherein the process further comprises:
notifying the first and second communication devices for power increasing or changing a position, whereby the first communication device transmits a service frame directly to the second communication device with increased power or proximity position at the shared time slot.

12. The communication device of claim 8, wherein the process further comprises:
transmitting a service frame to both of the first and the second communication devices at the shared time slot when the first and second communication devices subscribe a service from the communication device.

* * * * *